United States Patent
Tamaki

(10) Patent No.: US 7,050,081 B2
(45) Date of Patent: May 23, 2006

(54) LASER IRRADIATION DEVICE AND IMAGE RECORDER

(75) Inventor: Eiichi Tamaki, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 194 days.

(21) Appl. No.: 09/983,074

(22) Filed: Oct. 23, 2001

(65) Prior Publication Data

US 2002/0051471 A1 May 2, 2002

(30) Foreign Application Priority Data

Oct. 31, 2000 (JP) .................................. P2000-332622
Oct. 31, 2000 (JP) .................................. P2000-333347

(51) Int. Cl.
*B41J 2/47* (2006.01)

(52) U.S. Cl. ........................................ 347/239; 347/255
(58) Field of Classification Search ................. 347/135, 347/239, 255, 241, 244, 256, 258; 385/10; 359/562, 563, 223, 224, 572, 291, 231, 566; 349/210

See application file for complete search history.

(56) References Cited

U.S. PATENT DOCUMENTS

| | | | | |
|---|---|---|---|---|
| 4,729,640 A | * | 3/1988 | Sakata ......................... | 349/201 |
| 5,311,360 A | * | 5/1994 | Bloom et al. ................ | 359/572 |
| 5,929,979 A | | 7/1999 | Okino et al. .................. | 355/60 |
| 6,084,626 A | * | 7/2000 | Ramanujan et al. ......... | 347/239 |
| 6,147,789 A | | 11/2000 | Gelbart ........................ | 359/231 |
| 6,229,650 B1 | * | 5/2001 | Reznichenko et al. ...... | 359/566 |
| 6,268,948 B1 | * | 7/2001 | Gelbart ........................ | 359/231 |
| 6,411,425 B1 | * | 6/2002 | Kowarz et al. ............. | 359/291 |

FOREIGN PATENT DOCUMENTS

| | | |
|---|---|---|
| DE | 1999 19 143 A | 12/1999 |
| EP | 0 183 528 B | 1/1990 |
| WO | WO 97/26569 | 7/1997 |
| WO | WO 99/16040 | 4/1999 |

OTHER PUBLICATIONS

Corrigan R.W. et al.: An Alternative Architecture for High-Performance Display Smpte Journal, Smpte Inc. Scarsdale, N.Y, US, vol. 109, No. 7, Jul. 2000, pp. 568–572, XP000950345.

* cited by examiner

*Primary Examiner*—Hai Pham
(74) *Attorney, Agent, or Firm*—McDermott Will & Emery LLP

(57) ABSTRACT

A laser source emits a laser beam having a peak wavelength within the range from 800 nm to 820 nm. The laser beam emitted from the source passes through an illumination lens, and then impinges on a Grating Light Valve™. The light valve splits the laser beam into a multiplicity of light beams, modulates the multiplicity of light beams in response to image signals, and produces zero-order diffracted signal beams. The zero-order diffracted beams pass through an imaging lens, and are imaged on a recording medium wrapped on the surface of a drum.

13 Claims, 10 Drawing Sheets

LASER IRRADIATION DEVICE AND IMAGE RECORDER

BACKGROUND OF THE INVENTION

1. Field of the Invention

The present invention relates to a laser irradiation device for irradiating a medium with a laser beam modulated by Grating Light Valve, and an image recorder for recording an image on a recording material using a laser beam modulated by the laser irradiation device.

2. Description of the Background Art

Grating Light Valve is such a light valve that thousands of narrow, laterally arranged reflecting plates (or ribbons) are moved using an electrostatic force to cause diffraction which in turn is used to modulate a light beam. The Grating Light Valve functions as a plane mirror when all of the ribbons are coplanar, and as a reflective diffraction grating when alternate ones of the ribbons are moved down a distance equal to one quarter of the wavelength of a laser beam. The "Grating Light Valve" or "GLV" is trademarked and marketed by Silicon Light Machines (Sunnyvale, Calif., U.S.A.). Grating Light Valve™ is considered to function as a plane mirror when all of the ribbons are coplanar as mentioned above. It has been proved that light reflected from Grating Light Valve™ has a characteristic resulting from its structure.

More specifically, studies of the present inventor have shown that the reflectance of Grating Light Valve™ depends on the polarization of a laser beam incident on Grating Light Valve™, and that the reflectance of Grating Light Valve™ is maximum when the polarization of the laser beam is the same as a direction in which the ribbons are arranged (or is perpendicular to the longitudinal direction of the ribbons) and is minimum when the polarization direction of the laser beam is perpendicular to the direction in which the ribbons are arranged (or is the same as the longitudinal direction of the ribbons).

An image recorder which employs Grating Light Valve™ uses the diffraction grating to reflect and modulate a laser beam, thereby recording an image on a recording material.

In recent years, image recorders which use a technique (Computer-To-Plate or CTP technique) for directly recording an image on a printing plate have often employed a heat-sensitive recording material (or a thermal plate). Since the thermal plate has a lower sensitivity than a conventional silver halide based photosensitive material, a laser source having high power of 20 to 60 W is used.

For recording on the thermal plate, a laser source which emits a laser beam having a peak wavelength of 830 nm is often used and, in particular, used as a standard in the fields of printing and prepress.

Studies of the present inventor have also shown that the spectral reflectance of Grating Light Valve™ has a shoulder around 830 nm when the reflectance strongly depends on the wavelength.

Further, if a laser source which emits a laser beam having a peak wavelength of 830 nm is used, the reflectance of Grating Light Valve™ may be different from one another due to manufacturing process variations.

Furthermore, insufficient reflectance of Grating Light Valve™ leads to accordingly more energy of the laser beam absorbed as heat by Grating Light Valve™. This causes Grating Light Valve™ to be damaged by the absorbed heat energy.

SUMMARY OF THE INVENTION

The present invention is intended for a laser irradiation device for modulating a laser beam using a Grating Light Valve™, and an image recorder employing the laser irradiation device.

According to the present invention, the laser irradiation device comprises: a laser source for emitting a first laser beam; a first optical system for converting the first laser beam into a second laser beam; a Grating Light Valve™ having a plurality of reflective elements arranged in a predetermined direction for converting the second laser beam into modulated signal beams; and a second optical system for directing the signal beams onto a medium, wherein the second laser beam is linearly polarized in a direction substantially parallel to the predetermined direction.

Adjusting the direction of an electric vector of a laser beam minimizes light energy losses in the Grating Light Valve™ to efficiently use the laser beam.

According to one aspect of the present invention, the laser irradiation device comprising: a laser source for emitting a first laser beam linearly polarized from a plurality of light emitting points arranged in a first direction, the first laser beam being polarized in a second direction substantially perpendicular to the first direction; a first optical system for converting the first laser beam into a second laser beam; a Grating light Valve™ having a plurality of reflective elements arranged in the first direction for converting the second laser beam into modulated signal beams; and a second optical system for directing the signal beams onto a medium, wherein the first optical system comprises a half-wave plate for rotating a polarization of the first laser beam by 90 degrees.

According to another aspect of the present invention, the laser irradiation device comprises: a laser source having a single emitter for emitting a first laser beam substantially linearly polarized; a first optical system for converting the first laser beam into a second laser beam; a Grating Light Valve™ having a plurality of reflective elements arranged in a predetermined direction for converting the second laser beam into modulated signal beams; and a second optical system for directing the signal beams onto a medium, wherein the second laser beam is linearly polarized in a direction substantially parallel to the predetermined direction.

According to still another aspect of the present invention, the image recorder for modulating a laser beam to record an image on a recording medium comprises: a laser source for emitting a first laser beam having a peak wavelength ranging from 800 nm to 820 nm; a Grating Light Valve™ for modulating the first laser beam in response to an image signal to produce a zero-order diffracted beam used as a signal beam; and an imaging optical system for irradiating the recording medium with the zero-order diffracted beam.

The use of the laser beam having the peak wavelength ranging from 800 nm to 820 nm allows efficient and stable application of the energy of the laser source to the recording medium, and reduces thermal damages to the Grating Light Valve™.

It is therefore an object of the present invention to provide a laser irradiation device capable of efficiently using a laser beam, and an image recorder employing the laser irradiation device.

It is another object of the present invention to provide an image recorder capable of reducing thermal damages to a Grating Light Valve™.

These and other objects, features, aspects and advantages of the present invention will become more apparent from the following detailed description of the present invention when taken in conjunction with the accompanying drawings.

DESCRIPTION OF THE PREFERRED EMBODIMENTS

<First Preferred Embodiment>

Figure 1:
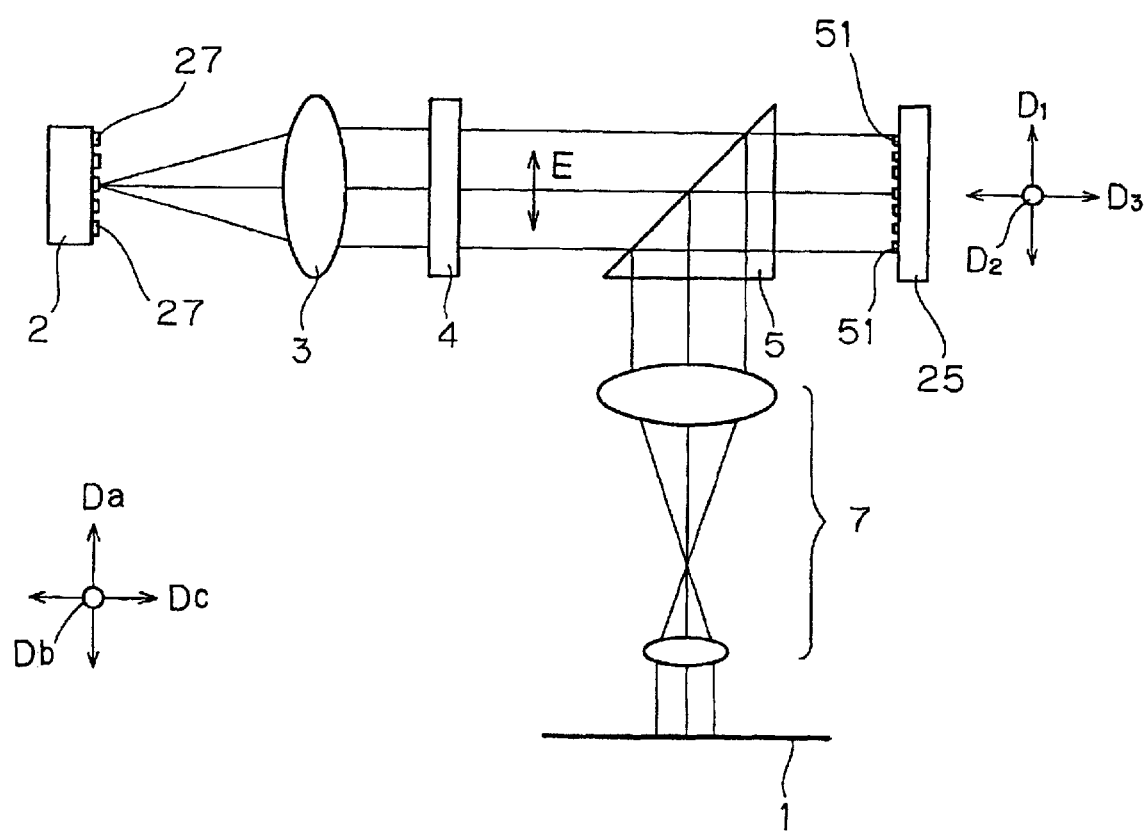
FIG. 1 is a schematic view of a laser irradiation device according to a first preferred embodiment of the present invention.

FIG. 1 is a schematic view of a laser irradiation device according to a first preferred embodiment of the present invention.

The laser irradiation device of FIG. 1 is used in an image recorder for imaging a laser beam on a to-be-irradiated medium 1 such as photosensitive and heat-sensitive materials to record an image thereon. The laser irradiation device of FIG. 1 comprises: a laser source 2; Grating Light Valve™ 25; an illumination optical system 3 for illuminating Grating Light Valve™ 25 with a laser beam emitted from the laser source 2; an imaging optical system 7 for imaging the laser beam modulated by Grating Light Valve™ 25 on the medium 1; a phase plate (half wave plate) 4 for rotating the polarization of the laser beam emitted from the laser source 2 by 90 degrees; and a prism 5 for deflecting the direction of the laser beam modulated by Grating Light Valve™ 25 by 90 degrees.

A semiconductor laser known as a bar laser (broad area semiconductor laser) having a multiplicity of linearly arranged emitters 27 is used as the laser source 2. The laser source 2 emits a linearly polarized laser beam in a direction Dc from each of the multiplicity of the emitters 27, the laser beam being linearly polarized in a direction Db substantially perpendicular to a direction Da (a vertical direction as viewed in FIG. 1) in which the emitters 27 are arranged. The laser source 2 emits a laser beam having a peak wavelength within the range from 800 nm to 820 nm.

The laser source 2 used herein is such a device as B1-83-40C-19-30-A and B1-830-60C-49-50-B available from COHERENT, Inc. (Santa Clara, Calif., U.S.A.). Although only five emitters 27 are shown in FIG. 1 for purposes of illustration, such a bar laser has tens of emitters.

Grating Light Valve™ 25 described above comprises a multiplicity of ribbons 51 arranged in a vertical direction D1 as viewed in FIG. 1, and modulates a laser beam impinging upon the ribbons 51.

Figure 7:
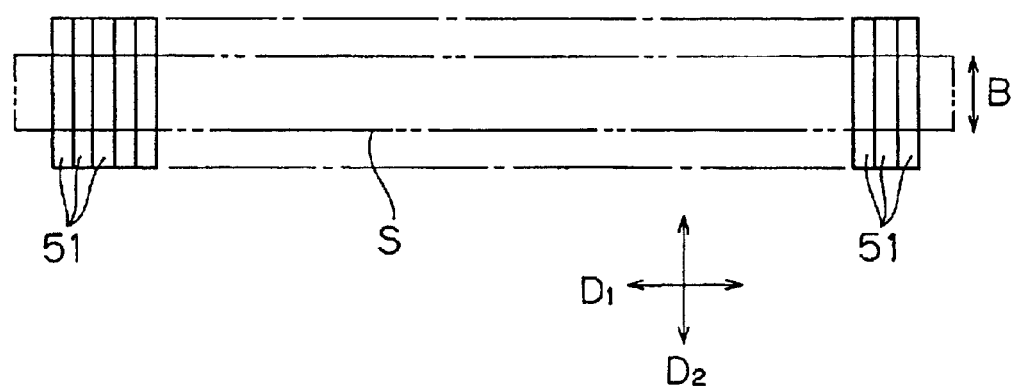
FIG. 7 is a schematic plan view of ribbons in Grating Light Valve™.
Figure 8:
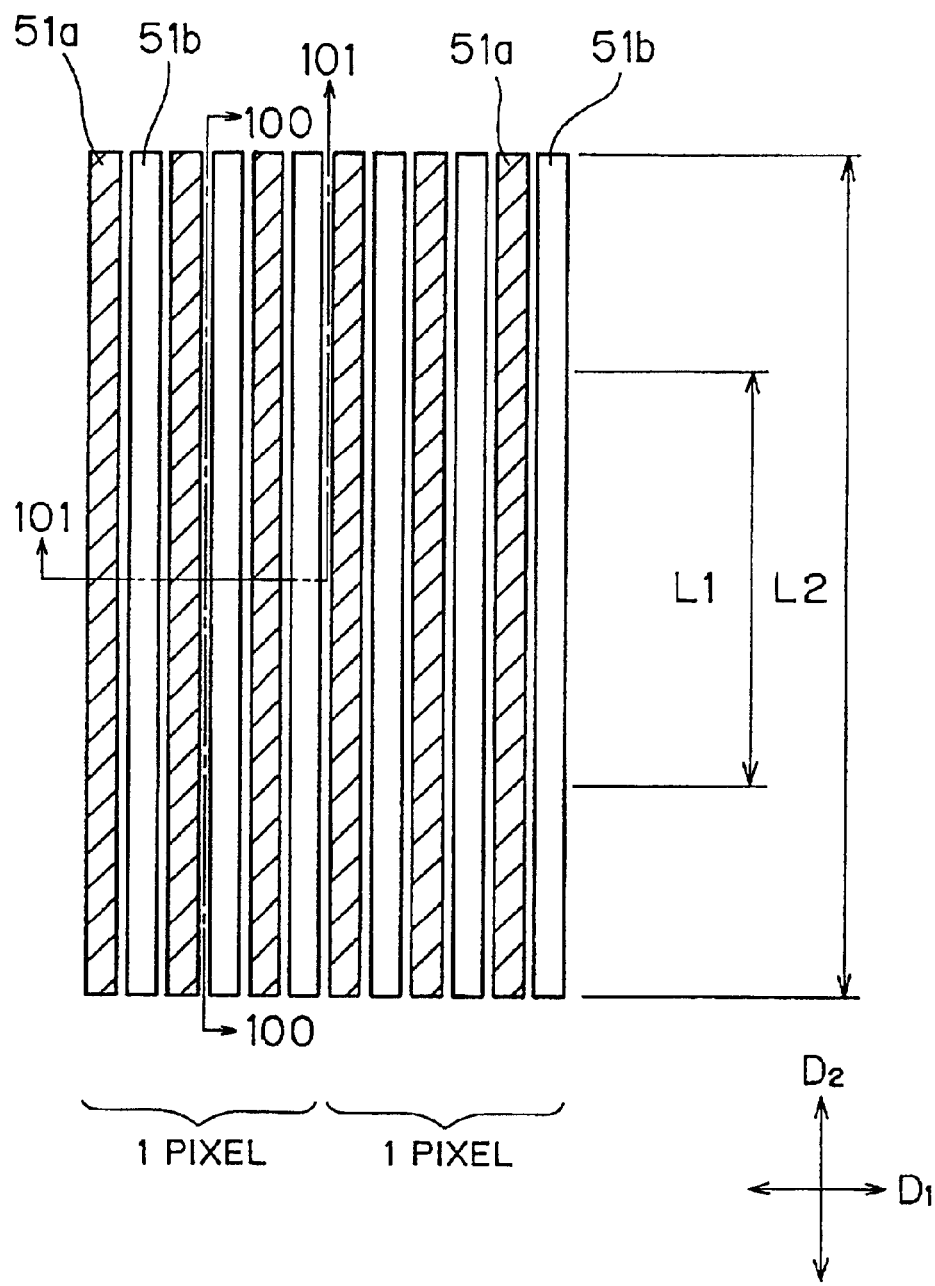
FIG. 8 is a partially enlarged view of FIG. 7.
Figure 9:
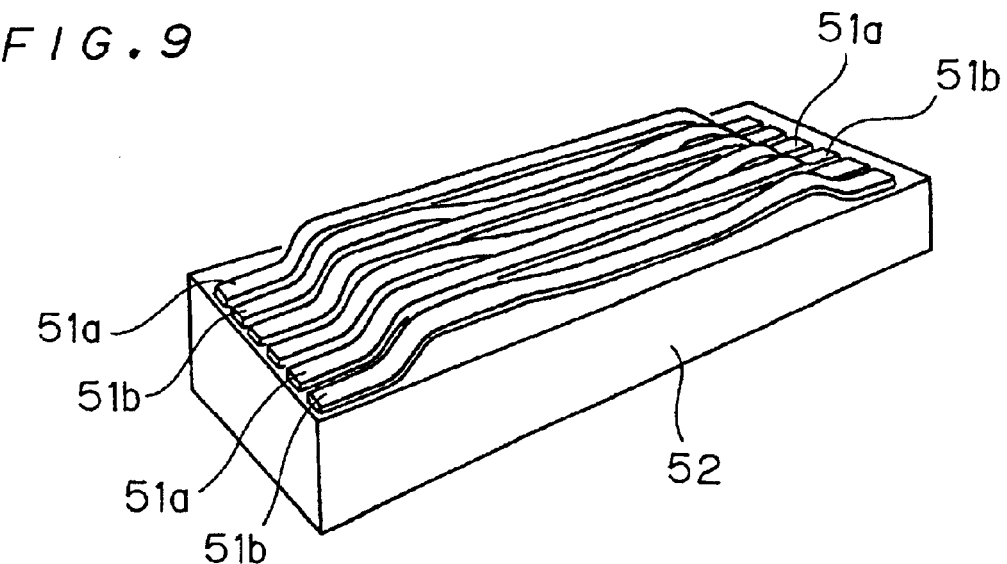
FIG. 9 is a perspective view of ribbons for one pixel with a substrate in Grating Light Valve™.

FIG. 7 is a schematic plan view of the ribbons 51 in Grating Light Valve™ 25. FIG. 8 is a partially enlarged view of FIG. 7. FIG. 9 is a perspective view of ribbons 51 for one pixel with a substrate 52 in Grating Light Valve™ 25.

Figure 10:
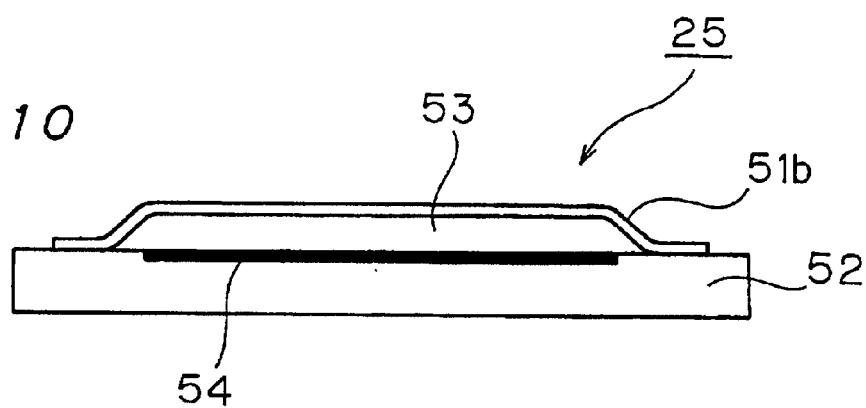
FIG. 10 is a sectional view taken along the line 100—100 of FIG. 8, with no voltage applied to an active ribbon.
Figure 11:
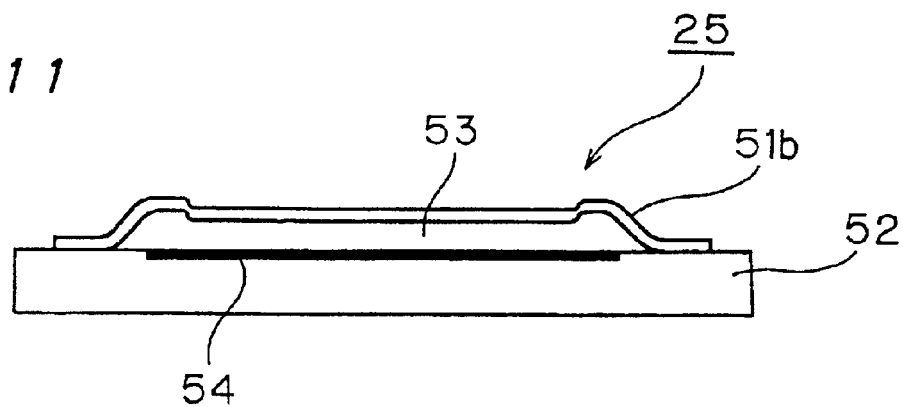
FIG. 11 is a sectional view taken along the line 100—100 of FIG. 8, with a voltage applied to the active ribbon.
Figure 12:
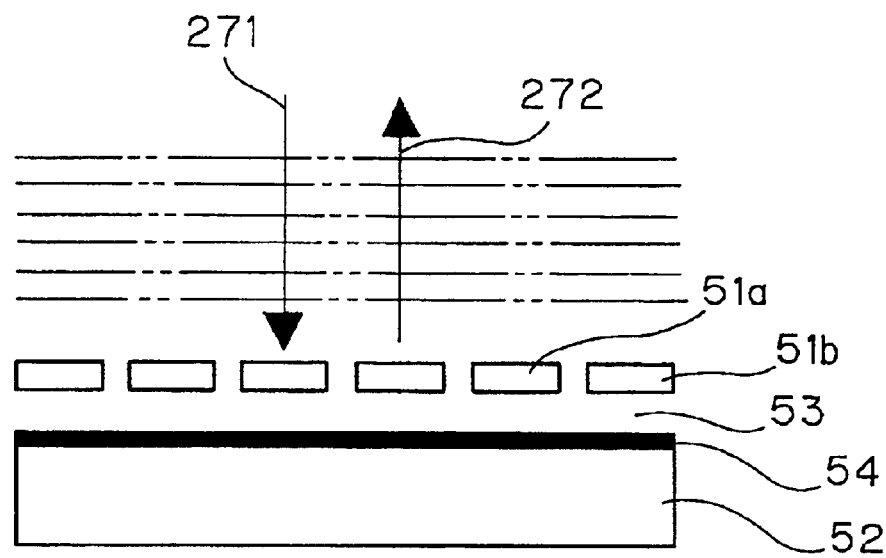
FIG. 12 is a sectional view taken along the line 101—101 of FIG. 8, with no voltage applied to active ribbons.
Figure 13:
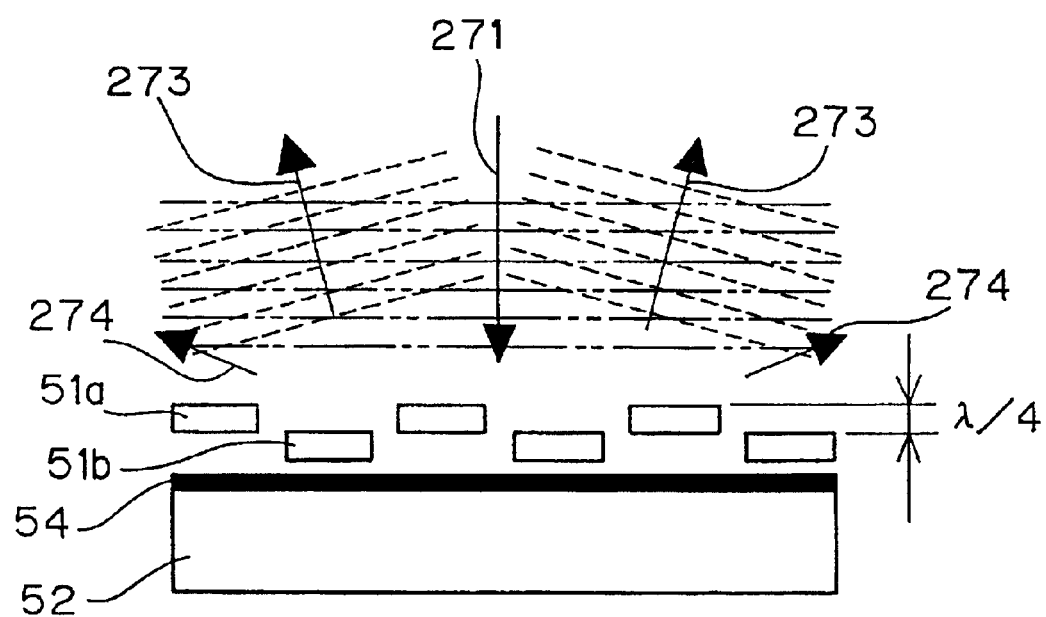
FIG. 13 is a sectional view taken along the line 101—101 of FIG. 8, with a voltage applied to the active ribbons.

FIG. 10 is a sectional view taken along the line 100—100 of FIG. 8, with no voltage applied to an active ribbon 51b. FIG. 11 is a sectional view taken along the line 100—100 of FIG. 8, with a voltage applied to the active ribbon 51b. FIG. 12 is a sectional view taken along the line 101—101 of FIG. 8, with no voltage applied to active ribbons 51b. FIG. 13 is a sectional view taken along the line 101—101 of FIG. 8, with a voltage applied to the active ribbons 51b.

As illustrated in these figures, Grating Light Valve™ 25 is constructed such that thousands of ribbons 51 are arranged in the lateral direction D1 on the substrate 52.

The ribbons 51 consist of "fixed ribbons 51a" and "active ribbons 51b" (both are generically referred to as "ribbons 51") which are arranged alternately, as shown in FIGS. 8 and 9. A thin film of aluminum is formed on the surface of each ribbon 51 for functioning as both a reflective mirror and an electrode. A common electrode 54 is provided under the ribbons 51, with certain distance 53 therebetween.

While the fixed ribbons remain on the same plane all the time, the active ribbons go down over a distance of one quarter of the laser wavelength in response to an applied voltage, as shown in FIGS. 9, 11 and 13.

Thus, Grating Light Valve™ 25 reflects an incident laser beam 271 to produce a zero-order diffracted beam 272 when no voltage is applied to the active ribbons 51b, and reflects the incident laser beam 271 to produce a pair of plus and minus first-order diffracted beams 273 and higher-order diffracted beams 274 when a voltage is applied to the active ribbons 51b.

Therefore, when irradiated with a laser beam, a rectangular region S (whose portion lying on the active ribbons 51b is included in the effective movable region L1 of the active ribbons 51b) indicated by the dash-double dot lines in FIG. 7 on the surface of the ribbons 51 of Grating Light Valve™ 25 produces a multiplicity of diffracted beams capable of being independently modulated.

Figure 5:
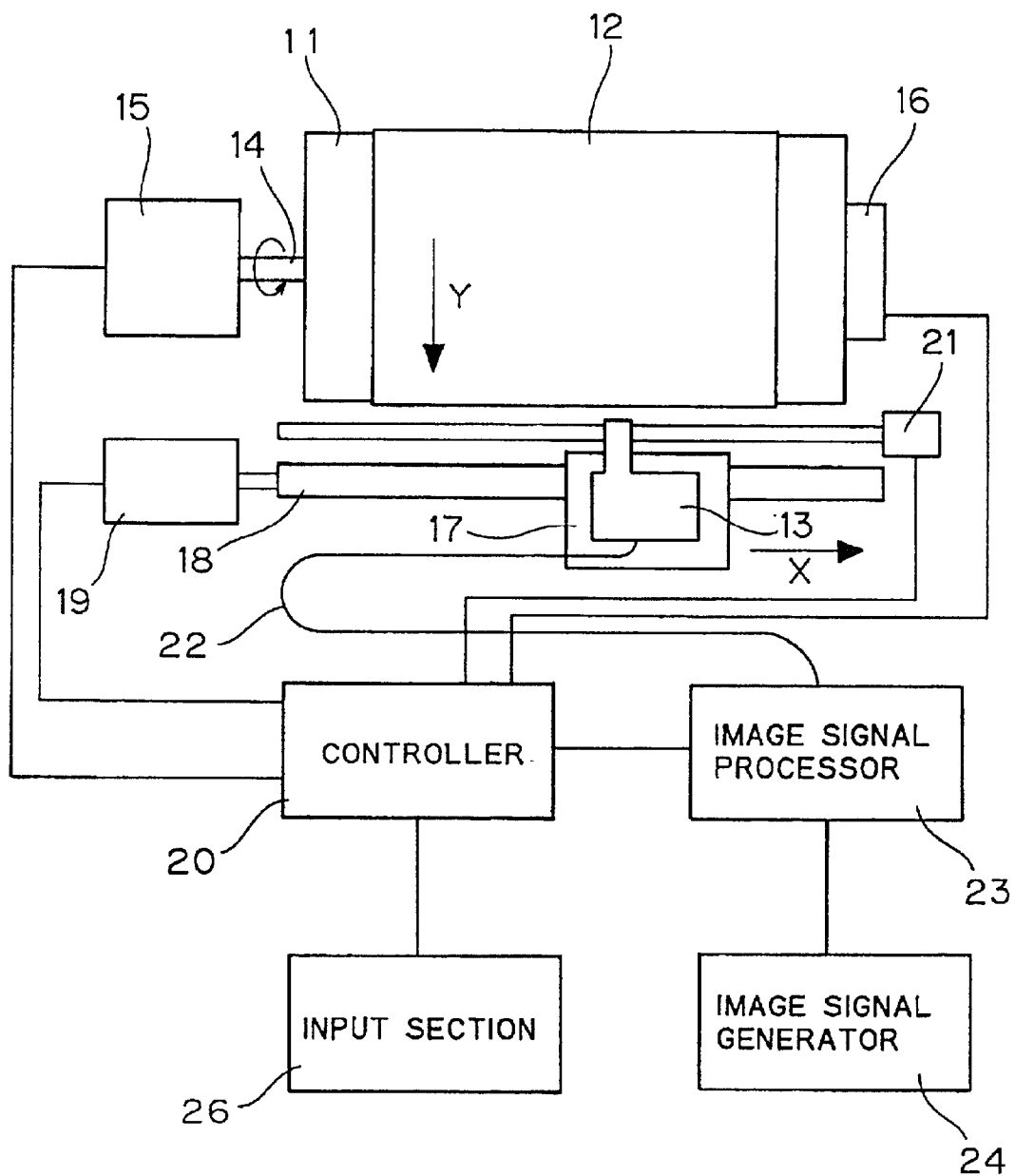
FIG. 5 shows a general construction of an image recorder according to a third preferred embodiment of the present invention.

Studies of the present inventor have shown that the reflectance of Grating Light Valve™ 25 having the above-mentioned construction depends on the polarization (i.e., the direction of an electric vector) of a laser beam incident on Grating Light Valve™ 25, and that the reflectance of Grating Light Valve™ 25 is maximum when the polarization of the laser beam is in the direction D1 in which the ribbons 51 are arranged (or is perpendicular to the direction D2 of the ribbons; the direction D1 corresponds to the X direction of FIG. 5) and is minimum when the polarization of the laser beam is in the direction D2 perpendicular to the direction D1 in which the ribbons 51 are arranged (or is the same as the direction D2; the direction D2 corresponds to the Y direction of FIG. 5).

The laser irradiation device shown of FIG. 1 employs the halfwave plate 4 for rotating the polarization of the laser beam emitted from the laser source 2 by 90 degrees to the direction D1 in which the ribbons 51 are arranged, as will be described later.

More specifically, in the laser irradiation device according to the first preferred embodiment of the present invention, the laser source 2 emits laser beams linearly polarized in the direction Db parallel with D2, the halfwave plate 4 disposed between the illumination optical system 3 and the Grating Light Valve™ 25 rotates the polarization by 90 degrees to the direction D1.

Therefore, the laser irradiation device according to the first preferred embodiment of the present invention can minimize light energy losses in Grating Light Valve™ 25. Additionally, the laser irradiation device can minimize the amount of energy absorbed by Grating Light Valve™ 25 to reduce the danger of thermal damages to Grating Light Valve™ 25 due to absorbed energy.

As stated above, the laser irradiation device according to the first preferred embodiment of the present invention is constructed such that the polarization direction E of the laser beam impinging on Grating Light Valve™ 25 is parall el to the direction D1 in which the ribbons 51 are arranged.

Although the first preferred embodiment employs the phase plate 4 as a polarization direction converter for rotating the polarization direction of the laser beam emitted from the laser source 2 by 90 degrees, other polarization direction converters may be used, for example, a polarization direction converter using a liquid crystal panel.

Studies of the present inventor have shown that, when no voltage is applied to the active ribbons 51b described above, the reflectance of Grating Light Valve™ varies with the wavelength of the laser beam emitted from the laser source.

Figure 14:
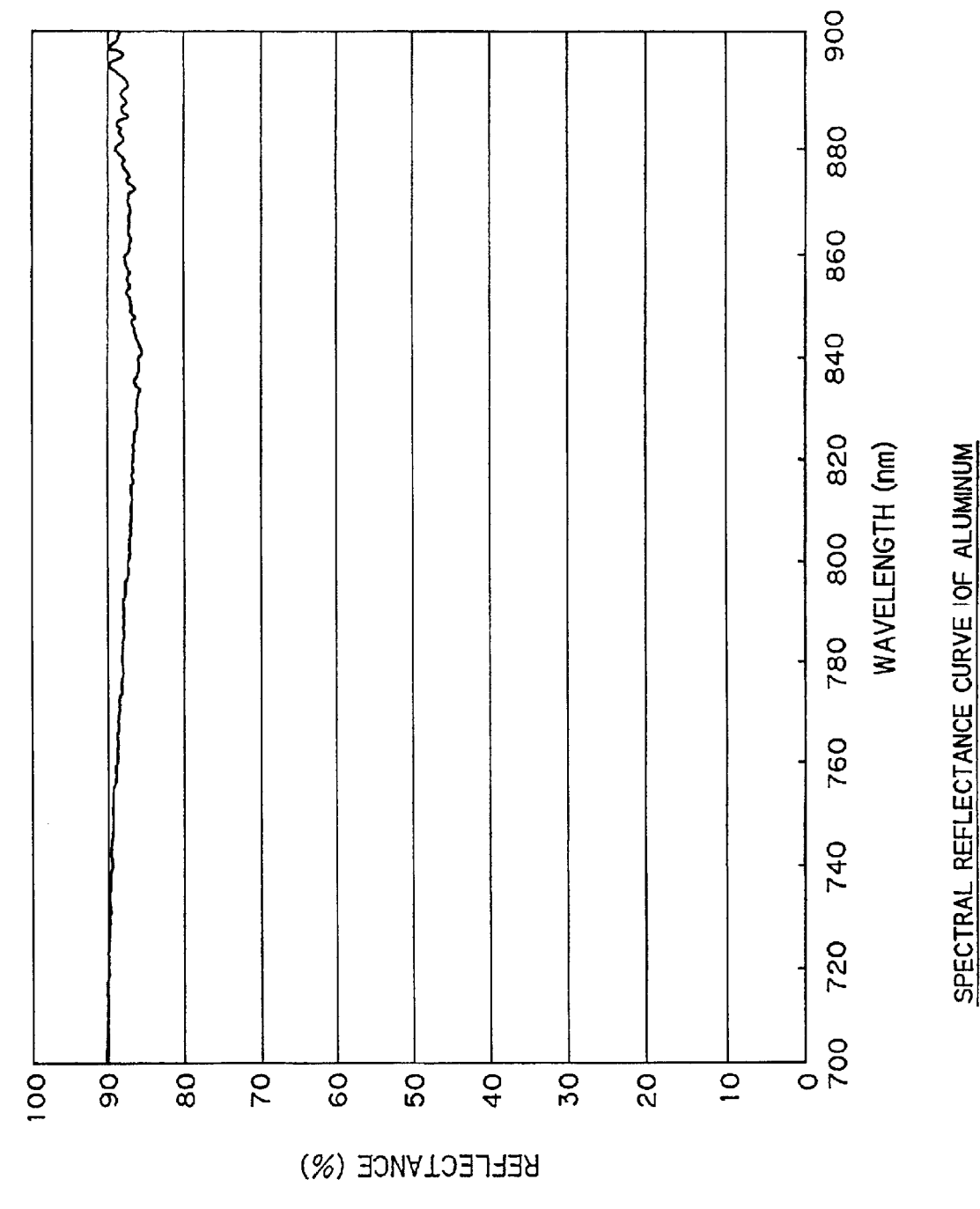
FIG. 14 is a graph showing a spectral reflectance curve indicating variations in reflectance of a single plane mirror of aluminum.
Figure 15:
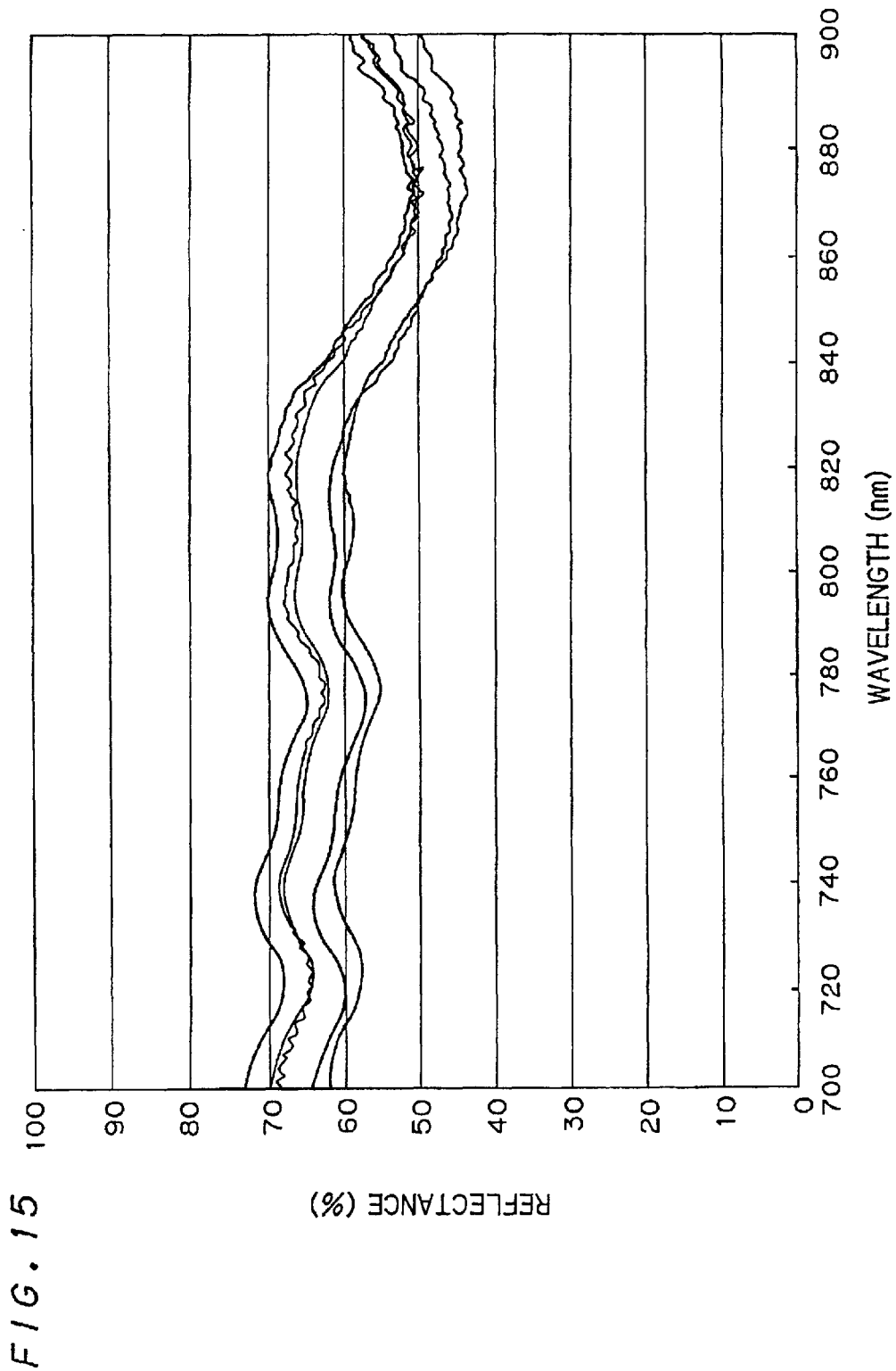
FIG. 15 is a graph showing spectral reflectance curves indicating variations in reflectance depending on wavelength of the laser source, with no voltage applied to the active ribbons of Grating Light Valve™.

FIG. 14 is a graph showing a spectral reflectance curve of aluminum. FIG. 15 shows spectral reflectance curves with no voltage applied to the active ribbons 51b of Grating Light Valve™ 25. Each curve is a measurement result on a different Grating Light Valve™.

As depicted in FIG. 14, there are no significant variations in reflectance of the single plane mirror of aluminum within the range of wavelength from 700 nm through 950 nm. In contrast, the reflectance shown in FIG. 15 varies significantly with wavelength of the laser source, with no voltage applied to the active ribbons 51b of Grating Light Valve™ 25.

FIG. 15 shows that the spectral reflectance curves have a plateau between 800 nm through 820 nm, and that the reflectance at 830 nm is relatively low.

The laser irradiation device according to the first preferred embodiment which uses a laser beam having a peak wavelength within the range from 800 nm to 820 nm is capable of efficiently applying the energy of the laser source 2 to the medium 1 and applying stable energy to the medium 1 independently of slight variations in wavelength of the laser source 2. Additionally, the reduction in energy absorbed by Grating Light Valve™ 25 reduces thermal damages to Grating Light Valve™ 25.

<Second Preferred Embodiment>

Figure 2:
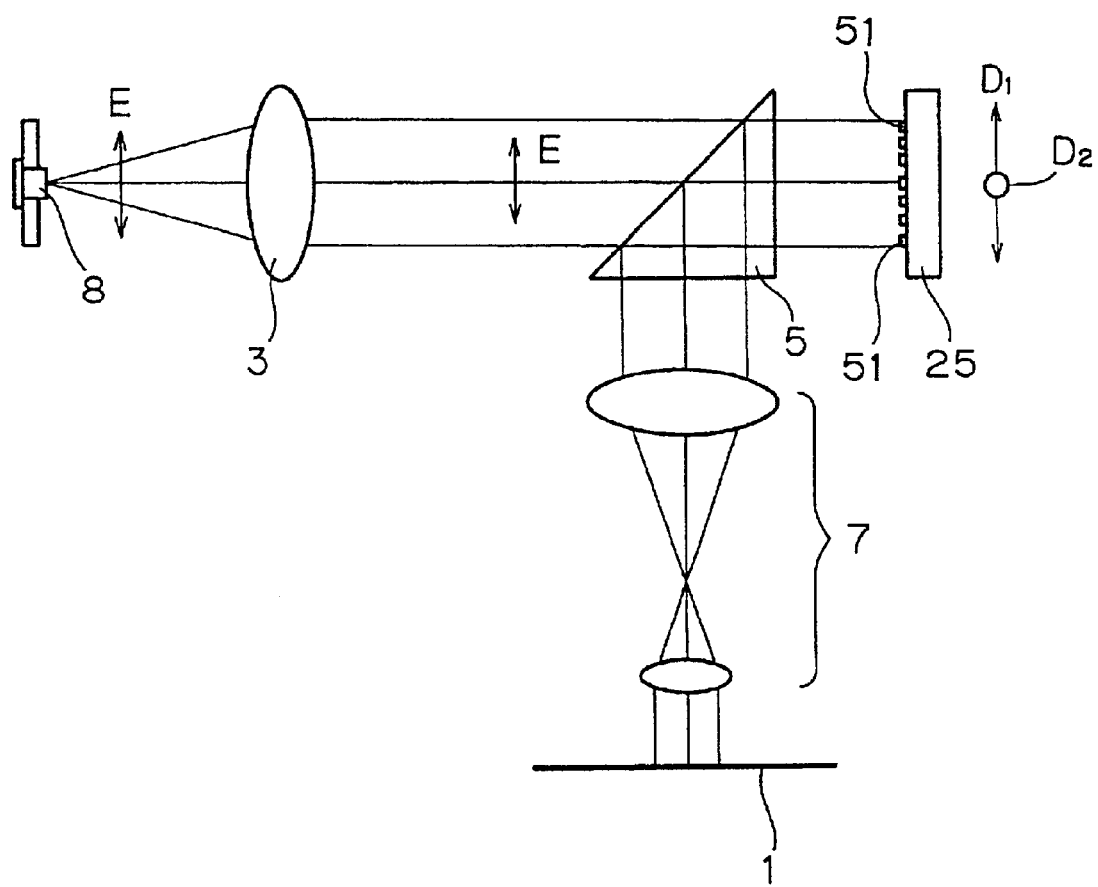
FIG. 2 is a schematic view of the laser irradiation device according to a second preferred embodiment of the present invention.

FIG. 2 is a schematic view of the laser irradiation device according to a second preferred embodiment of the present invention. Elements identical with those of the first preferred embodiment described above are designated by the same reference characters and are not described in detail. The laser irradiation device according to the second preferred embodiment employs a laser source 8 having a single emitter that emits a laser beam linearly polarized substantially in the direction D1.

The laser irradiation device according to the second preferred embodiment does not comprise the phase plate 4 used in the laser irradiation device according to the first preferred embodiment.

Figure 3:
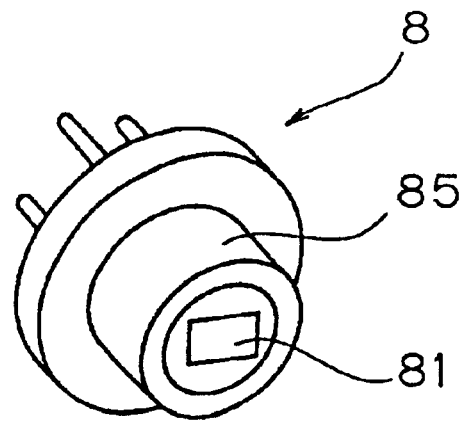
FIG. 3 is a perspective view of a laser source.
Figure 4:
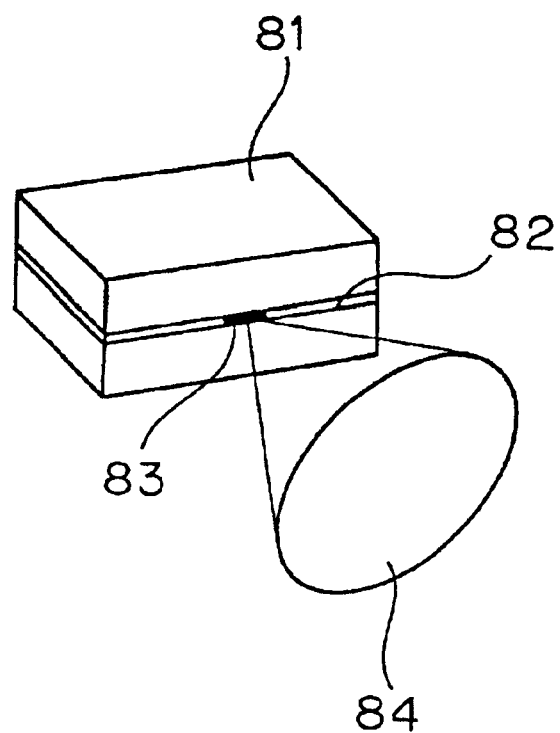
FIG. 4 is a perspective view, on an enlarged scale, of a semiconductor crystal of the laser source of FIG. 3.

FIG. 3 is a perspective view of the laser source 8, and FIG. 4 is a perspective view on an enlarged scale of a semiconductor crystal 81 of the laser source 8.

The laser source 8 is constructed such that the semiconductor crystal 81 is enclosed in a can-shaped package 85. An active layer 83 formed at an junction surface 82 of the semiconductor crystal 81 serves as a resonator to emit a linearly polarized laser beam 84. The polarization of the laser beam 84 can have two modes: a TE mode in which the polarization is parallel to the junction surface 82 of the semiconductor crystal 81, and a TM mode in which the polarization direction is perpendicular to the junction surface 82 of the semiconductor crystal 81.

Referring to FIG. 2, the laser source 8 can be disposed so that the polarization of the laser beam is parallel to the direction D1. The laser source 8 emits a laser beam having a peak wavelength within the range from 800 nm to 820 nm.

The laser irradiation device having such a construction can also minimize light energy losses in Grating Light Valve™ 25. Additionally, the laser irradiation device can minimize the amount of energy absorbed by Grating Light Valve™ 25 to reduce the danger of thermal damages to Grating Light Valve™ 25 due to absorbed energy.

Although the first and second preferred embodiments employ the laser sources 2 and 8, respectively, both emitting the linearly polarized laser beam, a laser source which emits a circularly polarized laser beam may be used, in which case a quarter wave plate.

<Third Preferred Embodiment>

FIG. 5 shows an image recorder according to a third preferred embodiment of the present invention.

The image recorder of FIG. 5 comprises a drum 11 on which a recording medium is wrapped; and a recording head 13 for irradiating the recording medium 12 with a modulated laser beam.

The drum 11 is connected through a shaft 14 to a main scanning motor 15. The drum 11 is driven by the main scanning motor 15 to rotate about the shaft 14. A rotary encoder 16 monitors the angular position of the drum 11.

The recording head 13 is placed on a table 17, which is connected to a sub-scanning transport mechanism 18 comprising a ball screw and a guide member not shown. The sub-scanning transport mechanism 18 is connected to a sub-scanning motor 19. The recording head 13 is driven by the sub-scanning motor 19 to move in the axial direction of the drum 11 (or in a sub-scanning direction indicated by the arrow X of FIG. 5). A linear encoder 21 monitors the position of the recording head 13 as viewed in the sub-scanning direction.

The recording head 13 is connected through a movable cable bundle 22 to an image signal processor 23. The image signal processor 23 processes an image signal transmitted from an image signal generator 24, and then transmits the processed image signal to the recording head 13.

The image recorder further comprises a controller 20 for controlling the entire recorder. The controller 20 is connected to the main scanning motor 15, the rotary encoder 16, the sub-scanning motor 19 and the linear encoder 21. The controller 20 is also connected to an input section 26 comprising an input means such as a keyboard and a display means such as a display.

The controller 20 is also connected to the image signal processor 23. The controller 20 controls the processing of the image signal in the image signal processor 23, and transmits a control signal for controlling the driving of the recording head 13 to the recording head 13 through the image signal processor 23 and the movable cable bundle 22.

In the image recorder according to the third preferred embodiment, the drum 11 is rotated to move the recording medium 12 in a main scanning direction indicated by the arrow Y of FIG. 5, and the recording head 13 is moved in the sub-scanning direction indicated by the arrow X. The recording head 13 irradiates the recording medium 12 with a laser beam modulated in response to the image signal to record a desired image on the recording medium 12.

Figure 6:
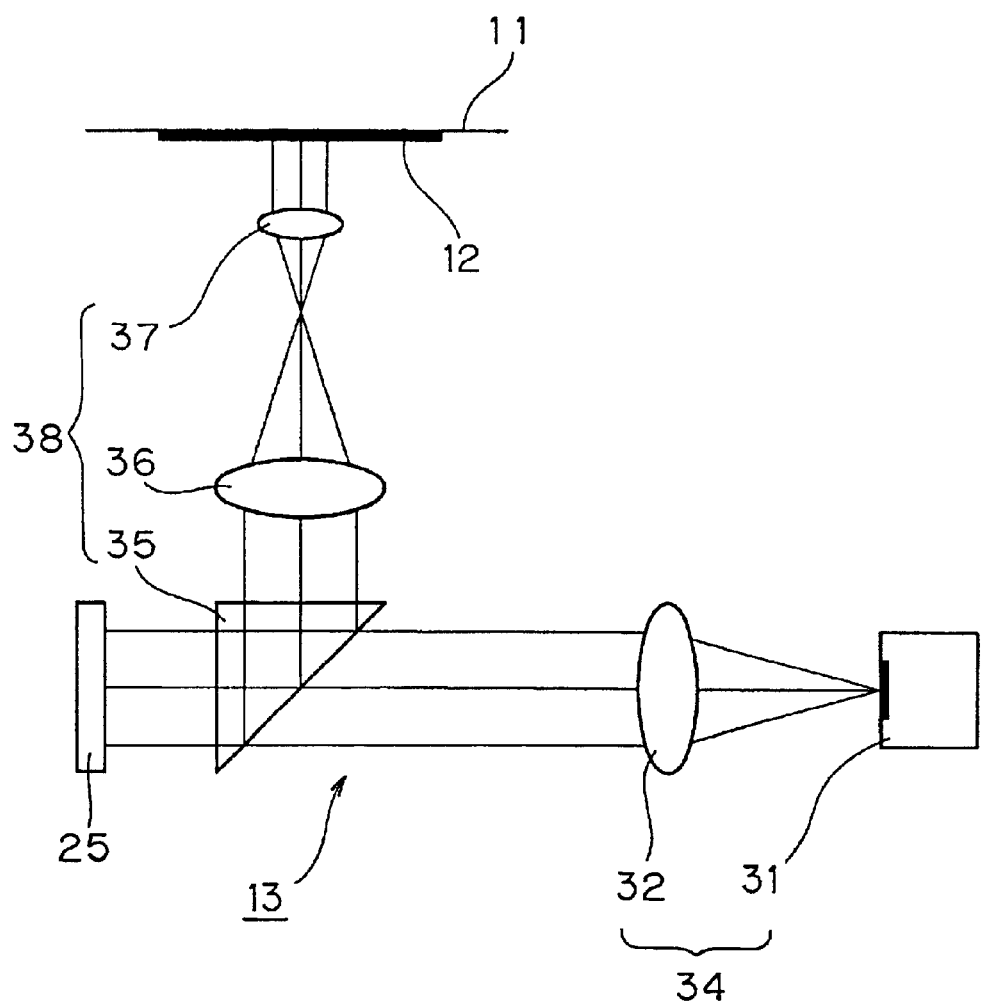
FIG. 6 is a schematic front view showing principal parts of a recording head according to the third preferred embodiment of the present invention.

FIG. 6 is a schematic front view of principal parts of the recording head 13 with the recording medium 12 on the drum 11 according to the third preferred embodiment of the present invention.

The recording head 13 comprises an illumination optical system 34 including a laser source 31 for emitting a laser beam and an illumination lens 32; Grating Light Valve™ 25; and an imaging optical system 38 including a prism 35, an imaging lens 36 and a lens 37.

The laser source 31 emits a laser beam having a peak wavelength within the range from 800 nm to 820 nm. The laser beam emitted from the source 31 passes through the illumination lens 32, and then impinges on Grating Light Valve™ 25. Grating Light Valve™ 25 splits the incident laser beam into a multiplicity of beams, and modulates the beams. Each modulated zero-order diffracted beam is reflected by the prism 35 so that the optical path thereof is bent, passes through the imaging lens 36 and the lens 37, and is imaged on the recording medium 12 mounted on the surface of the drum 11.

The image recorder according to the third preferred embodiment which employs the laser beam having the peak wavelength of 800 nm to 820 nm is capable of efficiently applying the energy of the laser source 31 to the recording medium 12 and applying stable energy to the recording medium 12 independently of variations in wavelength of the laser source 31. Additionally, the reduction in energy absorbed by Grating Light Valve™ 25 reduces thermal damages to Grating Light Valve™ 25.

Furthermore, the use of the recording medium 12 having the spectral sensitivity with the peak wavelength ranging from 800 nm to 820 nm achieves more effective use of the energy of the laser source 31.

While the invention has been described in detail, the foregoing description is in all aspects illustrative and not restrictive. It is understood that numerous other modifications and variations can be devised without departing from the scope of the invention.

What is claimed is:

1. A laser irradiation device comprising:
 a) a laser source for emitting a first laser beam;
 b) a first optical system for converting said first laser beam into a second laser beam;
 c) a diffraction grating light valve having a plurality of reflective elements arranged in a predetermined direction for converting said second laser beam into modulated signal beams, said plurality of reflective elements comprising
 a ribbon-shaped fixed reflective element having a fixed reflecting surface, and
 a ribbon-shaped movable reflective element having a movable reflecting surface; and
 d) a second optical system for directing said signal beams onto a medium,
 wherein said second laser beam is linearly polarized in a direction substantially parallel to said predetermined direction.

2. The laser irradiation device according to claim 1, wherein
 said first optical system comprises
 a polarization direction converter for converting a polarization of said first laser beam.

3. The laser irradiation device according to claim 2, wherein
 said polarization direction converter is a phase plate.

4. The laser irradiation device according to claim 3, wherein
 said first laser beam has a peak wavelength within the range from 800 nm to 820 nm.

5. A laser irradiation device comprising:
 a) a laser source having a plurality of emitters arranged in a first direction for emitting a first laser beam linearly polarized;
 b) a first optical system for converting said first laser beam into a second laser beam, in which said first laser beam is polarized in a second direction substantially perpendicular to said first direction when converting into said second laser beam;
 c) a diffraction grating light valve having a plurality of reflective elements arranged in said second direction for converting said second laser beam into modulated signal beams, said plurality of reflective elements comprising
 a ribbon-shaped reflective element having a fixed reflecting surface, and
 a ribbon-shaped movable reflective element having a movable reflecting surface; and
 d) a second optical system for directing said signal beams onto a medium,
 wherein said first optical system comprises a halfwave plate for rotating a polarization of said first laser beam by 90 degrees.

6. The laser irradiation device according to claim 5, wherein
 said first laser beam has a peak wavelength ranging from 800 nm to 820 nm.

7. A laser irradiation device comprising:
 a) a laser source having a single emitter for emitting a first laser beam substantially linearly polarized;
 b) a first optical system for converting said first laser beam into a second laser beam, said second laser beam being substantially the same in polarization direction as said first laser beam;
 c) a diffraction grating light valve having a plurality of reflective elements arranged in a predetermined direction for converting said second laser beam into modulated signal beams, said plurality of reflective elements comprising
 a ribbon-shaped fixed reflective element having a fixed reflecting surface, and
 a ribbon-shaped movable reflective element having a movable reflecting surface; and
 d) a second optical system for directing said signal beams onto a medium,
 wherein said laser source is so arranged that said first laser beam is linearly polarized in a direction substantially parallel to said predetermined direction.

8. The laser irradiation device according to claim 7, wherein said first laser beam has a peak wavelength within the range from 800 nm to 820 nm.

9. An image recorder for modulating a laser beam to record an image on a recording medium, said image recorder comprising:

a) a laser source for emitting a first laser beam having a peak wavelength ranging from 800 nm to 820 nm;

b) a diffraction grating light valve for modulating said first laser beam in response to an image signal to produce a zero-order diffracted signal beam, said diffraction grating light valve comprising b-1) a plurality of reflective elements arranged in a predetermined direction, said plurality of reflective elements comprising b-1-1) a ribbon-shaped fixed reflective element having a fixed reflecting surface, and b-1-2) a ribbon-shaped movable reflective element having a movable reflecting surface, wherein said first laser beam is linearly polarized in a direction substantially parallel to said predetermined direction; and c) an imaging optical system for irradiating said recording medium with said zero-order diffracted signal beam.

10. The image recorder according to claim 9, further comprising a polarization direction converter disposed between said laser source and said diffraction grating light valve for converting a polarization direction of said first laser beam.

11. The image recorder according to claim 10, wherein said polarization direction converter is a phase plate.

12. The image recorder according to claim 9, wherein said laser source has a plurality of emitters arranged in a first direction, said first laser beam being polarized in a second direction substantially perpendicular to said first direction, said image recorder further comprising d) a halfwave plate disposed between said laser source and said diffraction grating light valve for rotating a polarization of said first laser beam by 90 degrees.

13. The image recorder according to claim 9, wherein said laser source is so arranged that said first laser beam is linearly polarized in a direction substantially parallel to said predetermined direction.

* * * * *